April 11, 1961 G. R. SWANSON ET AL 2,979,327
FLUSH TYPE VEHICLE WINDOW
Filed Nov. 17, 1958 5 Sheets-Sheet 5

INVENTORS
Gordon R. Swanson, &
BY Peter W. Wozena
R. R. Barnard
ATTORNEY

United States Patent Office 2,979,327
Patented Apr. 11, 1961

1

2,979,327
FLUSH TYPE VEHICLE WINDOW

Gordon R. Swanson and Peter W. Wozena, Detroit, Mich., assignors to General Motors Corporation, Detroit, Mich., a corporation of Delaware Filed Nov. 17, 1958, Ser. No. 774,450

7 Claims. (Cl. 268—124)

The present invention relates to an improved window actuating mechanism of the type particularly adapted for use with an automobile. More specifically, the present invention relates to a window actuating mechanism which is capable of positioning a raised window in substantially flush relation with the outer door or body panel with which it is associated.

For reasons of window storage and complication of the operating mechanism, it has been the practice in the past to mount vehicle windows somewhat inboard of the outer door or body panel with which they are associated. In addition to the improved appearance which obtains with a flush mounted type window, functional advantages are realized also. With windows which are set inboard from the outer door or body panel, it is necessary to provide sealing means to keep water from seeping within the door and which means frequently detracts from the vehicle's appearance. With a flush type window the propensity for collecting or admitting water between the window and door is substantially eliminated.

The subject window operating mechanism includes means for vertically raising and lowering the window and uniquely combines therewith means for translating or shifting the window laterally into a flush relationship when the window is in its upper or fully closed position.

The details as well as other objects and advantages of the present invention will be apparent from a perusal of the detailed description which follows.

Figure 1:
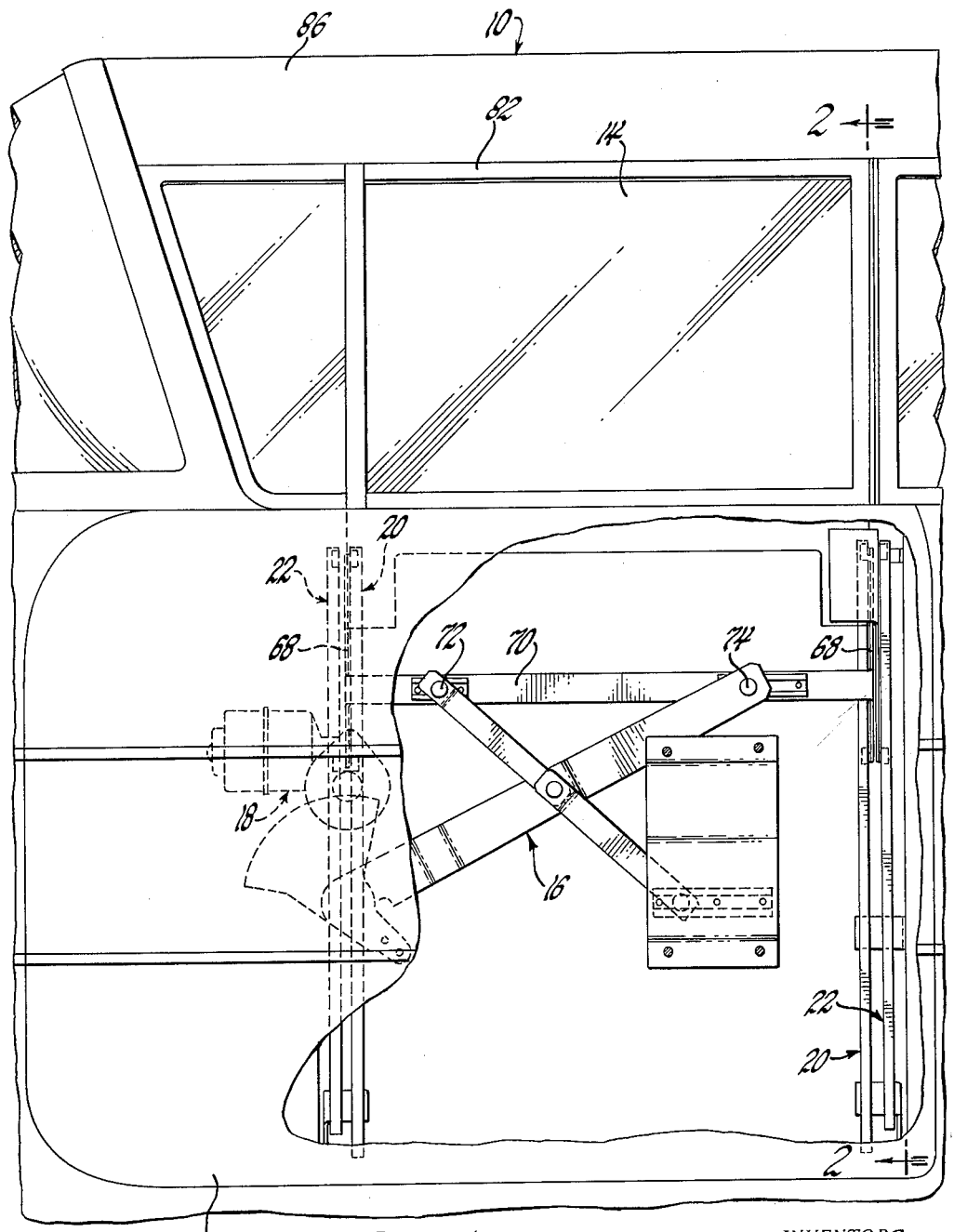
Figure 1 is an elevational view of a vehicle door embodying the present invention.

Referring first to Figure 1, a vehicle is indicated generally at 10 and includes a door 12 within which a window 14 is adapted to be mounted for vertical raising and lowering. By means of structure to be subsequently considered in greater detail, window 14 is connected with a conventional window raising and lowering mechanism indicated generally at 16. Window actuating mechanism 16 may either be manually controlled or, as illustrated in the drawings, controlled by an electric motor and gear sector device indicated generally at 18.

Figure 2:
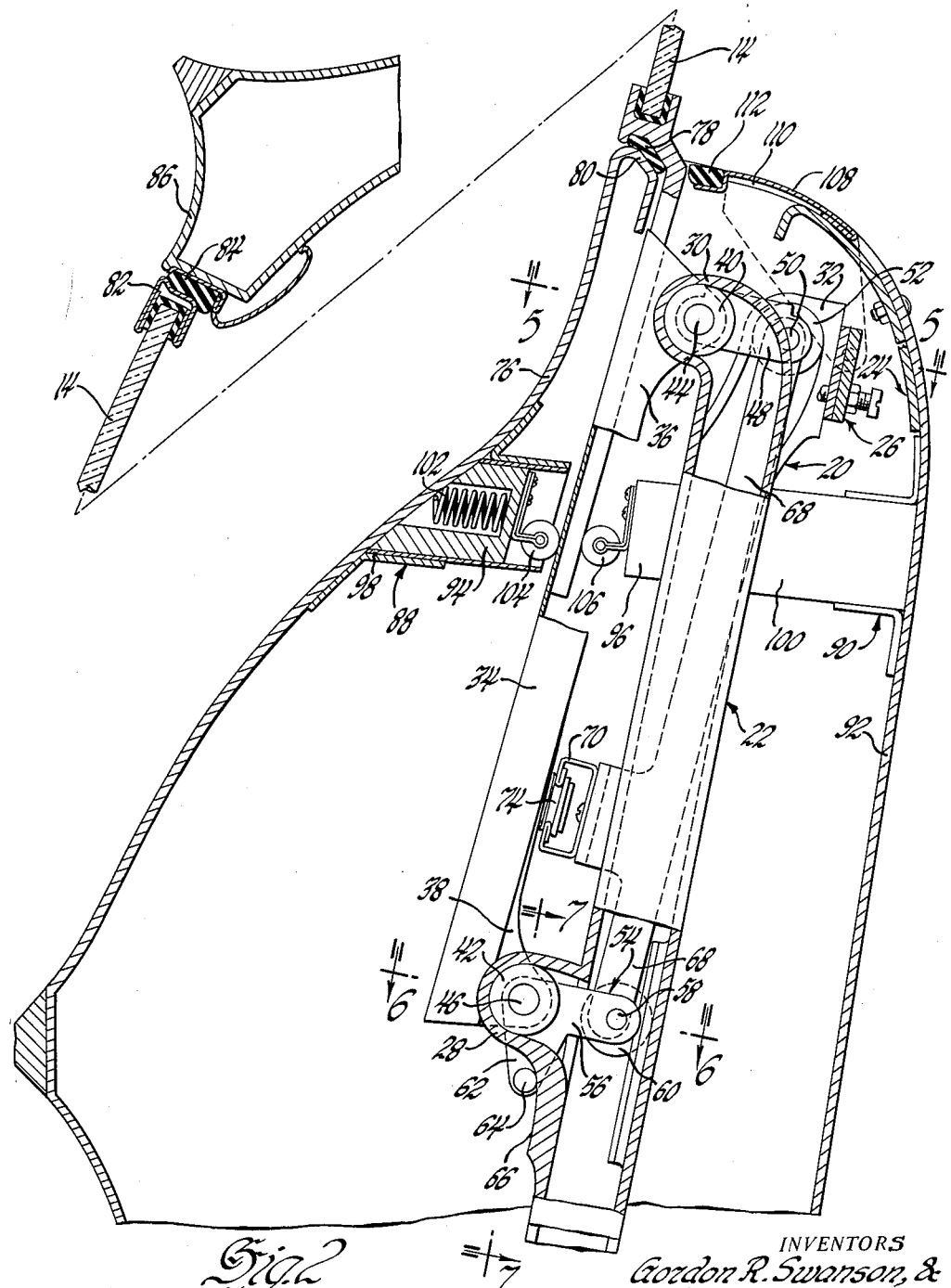
Figures 2 through 4 are sectional views along line 2—2 of Figure 1 showing the window in various positions.
Figure 3:
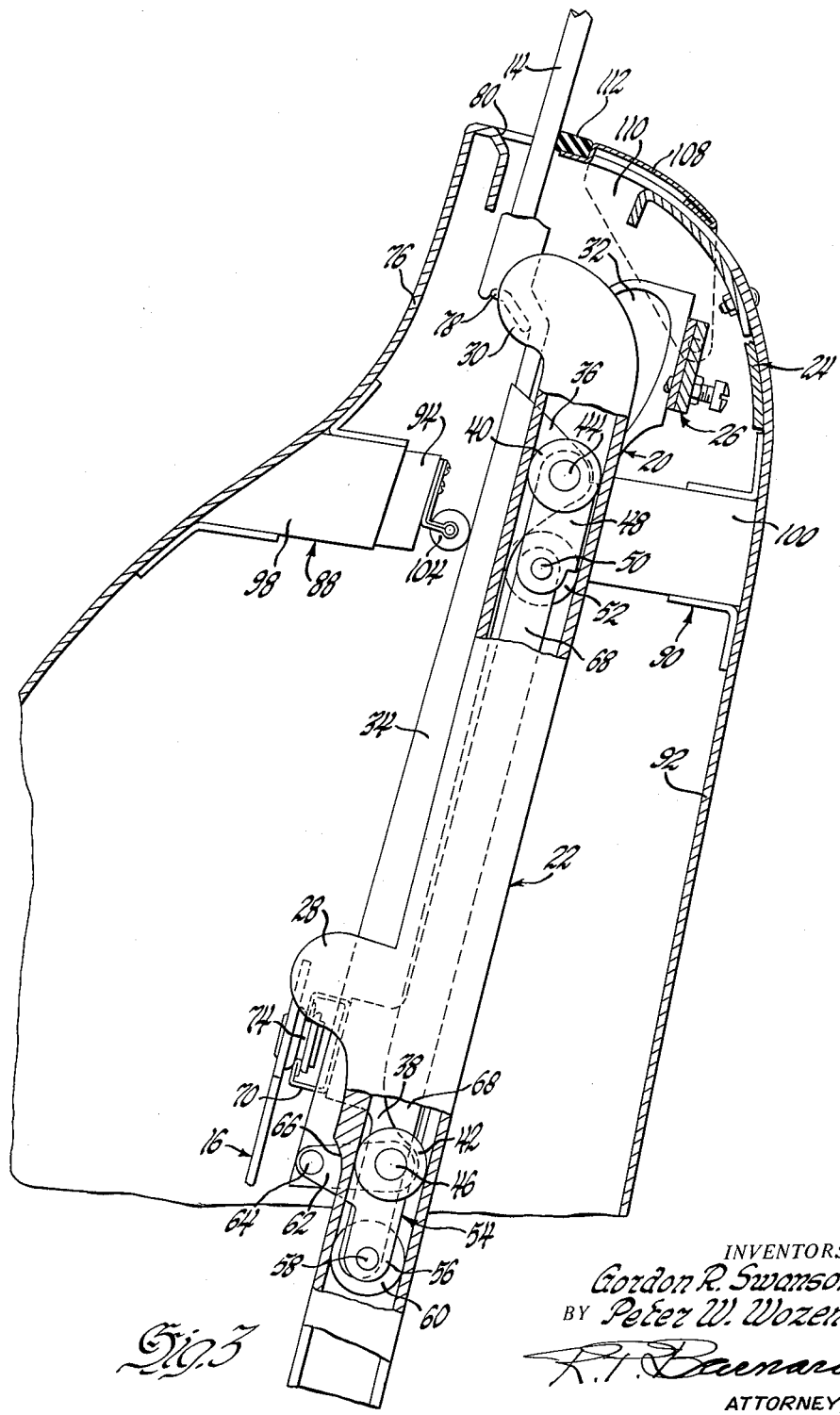
Figure 4:
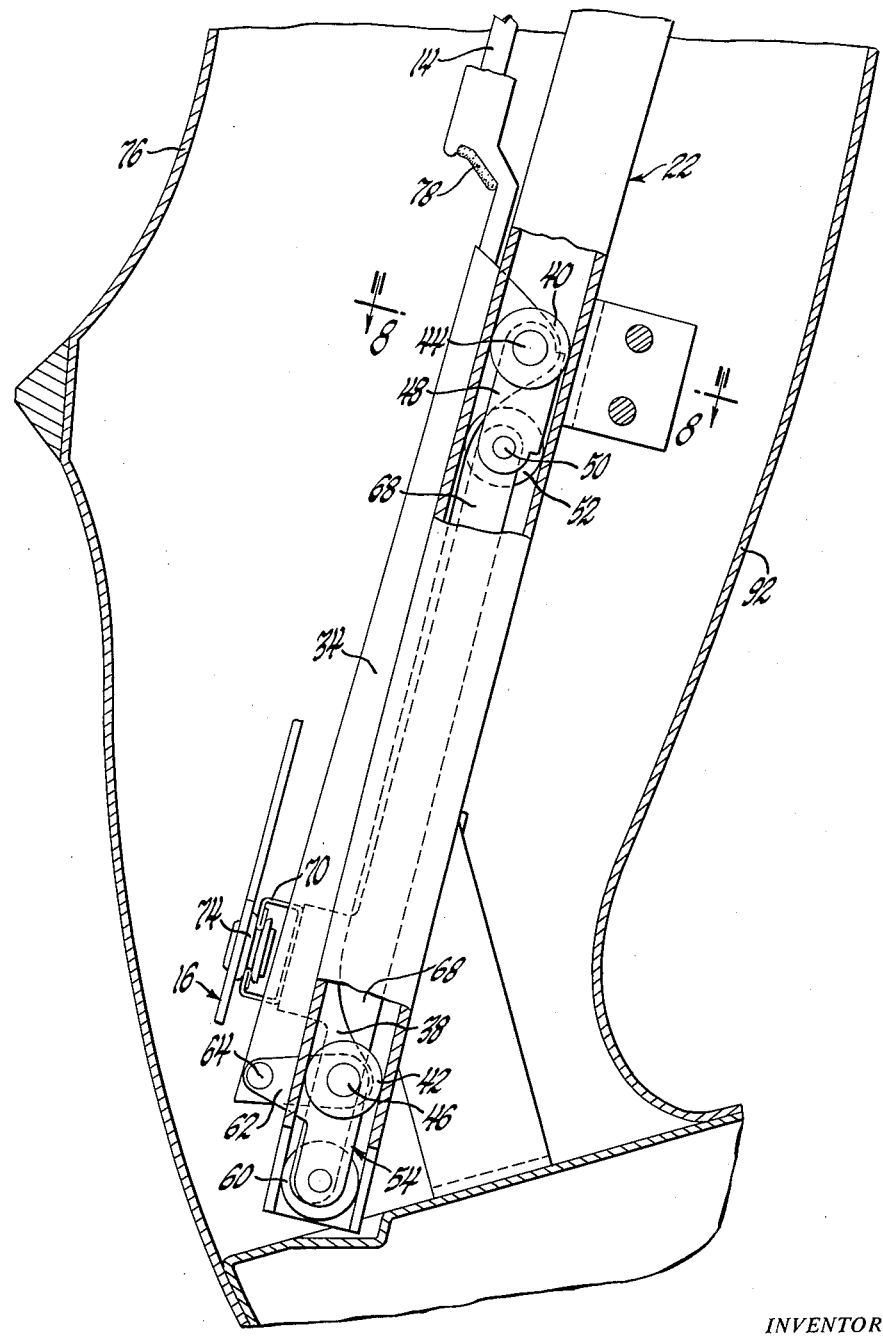
Figure 5:
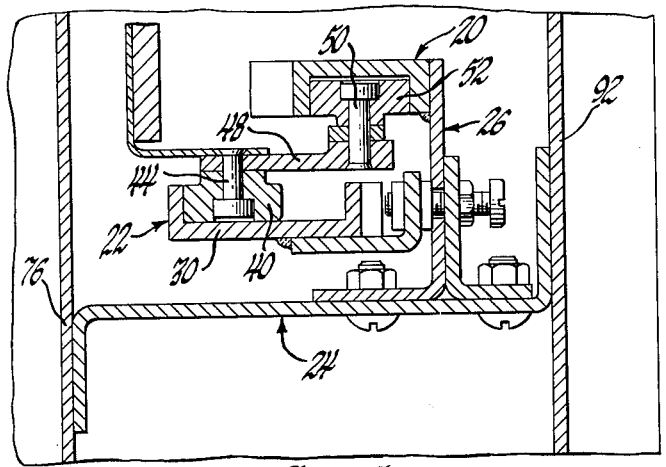
Figure 5 is a view along line 5—5 of Figure 2.
Figure 6:
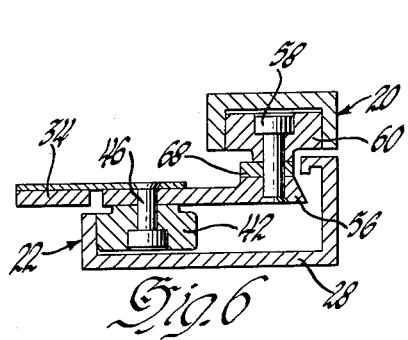
Figure 6 is a view along line 6—6 of Figure 2.
Figure 7:
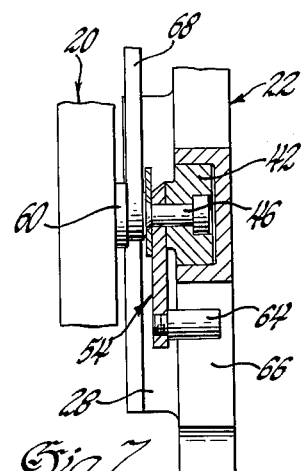
Figure 7 is a view along line 7—7 of Figure 2.
Figure 8:
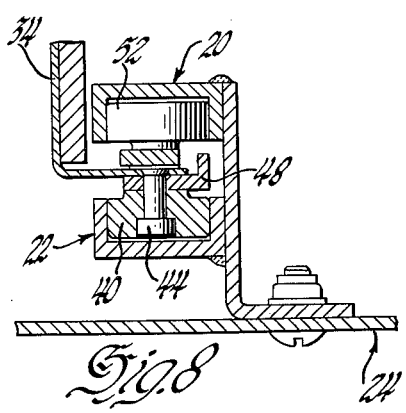
Figure 8 is a view along line 8—8 of Figure 4.

Referring more specifically to Figures 2 through 4, inboard and outboard guides 20 and 22 are mounted in any suitable manner on the door side panel 24 as through the bracket device indicated generally at 26 in Figure 5.

A pair of inboard and outboard guides 20 and 22 are provided at each side of window 14. Each of the guide sets are of identical construction, therefore, only one set will be described.

It will be noted that the guides 20 and 22 are generally aligned at their lower portion. Outboard guide 22 has a guide extension 28 approximately intermediate its length and a guide extension 30 at its upper end. Inboard guide 20 also has a guide extension 32 at its upper end.

A depending plate 34 is secured to the lower edge of window 14 and includes a pair of laterally inwardly extending ears 36 and 38 each of which has a roller 40 and 42 respectively pivotally mounted thereon through pins 44 and 46. Rollers 40 and 42 move only in the outboard guide 22. A link 48 is pivotally secured at one end to ear 36 through pin 44. The other end of link 48 is pivotally secured through a pin 50 to a roller 52 which is movable only in the inboard guide 20.

A bellcrank 54 is pivotally secured through pin 46 to ear 38. One leg 56 of bellcrank 54 is pivotally secured through a pin 58 to a roller 60 movable only in the inboard guide 20. The other leg 62 of bellcrank 54 includes a pin or follower 64 fixed thereto. Follower pin 64 is adapted to engage a cam surface 66 formed on the outboard guide 22 proximate the guide extension 28. A link 68 is pivotally secured to link 48 through pin 50 and to bellcrank 54 through pin 58.

The links 68 associated with the respective guide sets at either side of window 14 are interconnected through a cross member 70 to which window actuating mechanism 16 is suitably articulated at points 72 and 74 as best seen in Figure 1.

Referring first to Figure 2, when it is desired to lower window 14, link 68 is shifted downwardly so as to move the rollers 52 and 60 downwardly within the inboard guide 20. This movement of link 68 pulls the rollers 40 and 42 out of the guide extensions 30 and 28 into vertically spaced relationship with rollers 52 and 60 as will best be seen in Figures 3 and 4. This inboard shifting of rollers 40 and 42 imparts a similar shifting movement to window 14 shifting the latter inboard of door 12 so that the lower edge of the window is moved out of abutting relationship with the door outer panel 76. Thereafter, further downward movement of links 68 will cause window 14 to move downwardly within door 12 to its fully lowered position as seen in Figure 4.

When window 14 is moved to its up position, the rollers move along the respective guides 20 and 22 in their vertically spaced relationship until pin 64 engages cam surface 66 of the outboard guide 22. Thereafter continued upward movement of link 68 causes the bellcrank 54 to swing about its pivot 46 in a counterclockwise direction to move roller 42 into extension 28 of guide 22 and to horizontally align roller 60 therewith in guide 20. Simultaneously with this movement of bellcrank 54, roller 40 will also be moved into the extension 30 of guide 22 and roller 52 into extension 32 of guide 20 to locate these rollers in horizontal aligned relationship and to move the window to its up position. At the same time window 14 is shifted outboard into flush relation with door panel 76.

A seal strip 78 is cemented to window plate 34 and coacts with the upper edge 80 of door panel 76 to seal and cushion the window in its closed position.

As seen in Figures 1 and 2, an upper window channel 82 is adapted to abut against a seal strip 84 secured to roof panel 86.

A pair of aligned snubber devices 88 and 90 are respectively mounted on the inner and outer panels 92 and 76 of door 12 to resiliently support window 14 in its lateral movement relative to the door. Snubbers 88 and 90 are essentially identical and include piston members 94 and 96 slidably disposed in cylinders 98 and 100. Each of the pistons 94 and 96 is biased toward window plate 34 by a spring 102. The pistons also include roller members 104 and 106 suitably mounted thereon so that the action of the snubbers in no way inhibits the up and down movement of the window.

A spring biased hinge cover 108 is provided to provide access into the door well. Cover 108 is biased in a closing or outboard direction when window 14 is in its down position since the opening 110 otherwise necessarily provided to permit the lateral movement of window 14 would be large and unsightly. As window 14 is shifted laterally inwardly preliminarily to lowering the same, cover 108 is likewise moved laterally or inboard to accommodate such window movement. A seal strip 112 is secured along the outer edge of cover 108.

We claim:

1. A window operating mechanism of the type in which a window is retractably mounted within a vehicle body, said body including an outer wall with which said window is adapted to be mounted in flush relationship when said window is in its fully closed position, said mechanism comprising plate means mounted on and depending from said window within said body, a pair of vertically spaced roller members mounted on said plate means, a first guide member mounted proximate said plate means and adapted to receive said roller members, said guide member including an arcuate extension proximate its upper end and another arcuate extension intermediate its ends, said arcuate extensions extending in the direction of the outer wall of said body, a second guide member disposed proximate said first guide member and including an arcuate extension at its upper end, the arcuate extension of said second guide member extending in substantially the opposite direction as the arcuate extensions of said first guide member, a first link member articulated to the upper of said roller members, a third roller pivotally connected to the other end of said link and adapted to track within said second guide member, a bellcrank lever pivoted to the lower of said pair of rollers, a fourth roller pivoted to one arm of said bellcrank lever and adapted to track within said second guide member, a second link interconnecting said third and fourth roller members, means operatively connected to said second link for moving said rollers up and down within said guide members to provide opening and closing movements to said window, and means for imparting rotation to said bellcrank lever and said first link whereby said pair of rollers are forced to move into the arcuate extensions of the first guide member as the window approaches its uppermost position whereby said window is moved laterally relative to said body to position the window in flush relationship with the outer wall of said body.

2. A window operating mechanism of the type in which a window is retractably mounted within a vehicle body, said body including an outer wall with which said window is adapted to be mounted in flush relationship when said window is in its fully closed position, said window including a pair of longitudinally spaced substantially vertical edges, said mechanism comprising plate means mounted on and depending from said window within said body, first and second pairs of vertically spaced roller members respectively mounted on said plate means adjacent said window edges, first guide members mounted proximate said plate means and adapted to respectively receive said first and second pairs of roller members, each of said guide members including an arcuate extension proximate its upper end and another arcuate extension intermediate its ends, said arcuate extensions extending in the direction of the outer wall of said body, second guide members disposed proximate said first guide members and including an arcuate extension adjacent the upper ends, the arcuate extensions of said second guide members extending in substantially the opposite direction as the arcuate extensions of said first guide members, first link members articulated to the upper roller member of each of said pairs, third roller members pivotally connected to the other ends of said links and adapted to track within said second guide members, bellcrank levers pivoted to the lower roller of each of said pairs, fourth rollers pivoted to one arm of said bellcrank levers and adapted to track within said second guide members, second links interconnecting the third and fourth roller members of each pair, means operatively connected to said second links for moving said rollers up and down within said guide members to provide opening and closing movements to said window, and means for imparting rotation to said bellcrank levers and said first links whereby said first pair of rollers is forced to move into the arcuate extensions of the first guide members as the window approaches its uppermost position whereby said window is moved laterally relative to said body to position the window in flush relationship with the outer wall of said body.

3. A window operating mechanism as set forth in claim 1 in which rotation of the bellcrank lever causes the third roller to move with the arcuate extension of said second guide member permitting the latter roller to substantially horizontally align with said upper roller whereby the first link causes the latter roller to move within the upper arcuate extension.

4. A window operating mechanism as set forth in claim 1 in which the bellcrank rotating means comprises a cam surface formed on the first guide member proximate the intermediate arcuate extension, a follower member on the other arm of the bellcrank lever, said follower member adapted to engage said cam surface to impart said rotation to the bellcrank lever.

5. A window operating mechanism as set forth in claim 2 in which the means operatively connected to said second links includes a common member fixed between said links.

6. A window operating mechanism as set forth in claim 1 in which the first and second guide members are longitudinally offset from each other.

7. A window actuating mechanism for raising and lowering a window of the type adapted to be mounted on a hollow support structure, said support structure including at least one outer wall with which said window is adapted to be mounted in flush relationship when the window is in its fully closed position, said mechanism comprising a plurality of roller elements mounted on said window, guide means generally aligned in the direction of up and down window movement, said rollers being disposed in said guide means, means operatively connected to said window for moving said window in up and down directions causing said rollers to track within said guide means, said guide means including a main guide section terminating at one end in a first portion extending laterally from said section, a second portion extending laterally from said section and longitudinally spaced from the first portion, said plurality of rollers including a pair of linked rollers adapted to coact with said main guide section and each laterally extending guide portion whereby one roller of each pair is moved laterally relative to said window thereby moving said window to a flush position with respect to said wall when the window is in its closed position, said guide means and rollers coacting to move the window laterally away from said wall during the initial movement of the window from its closed toward an open position.

References Cited in the file of this patent

UNITED STATES PATENTS

| | | |
|---|---|---|
| 2,112,330 | Carr | Mar. 29, 1938 |
| 2,399,109 | Geer | Apr. 23, 1946 |

FOREIGN PATENTS

| | | |
|---|---|---|
| 594,946 | Germany | Mar. 23, 1934 |
| 59,173 | Denmark | Nov. 3, 1941 |